United States Patent

Cooper

[15] 3,697,997
[45] Oct. 10, 1972

[54] INTERFEROMETER AND ANGLE ENCODING NAVIGATION SYSTEM

[72] Inventor: Herbert W. Cooper, Hyattsville, Md.
[73] Assignee: Westinghouse Electric Corporation, Pittsburgh, Pa.
[22] Filed: Oct. 13, 1970
[21] Appl. No.: 80,391

[52] U.S. Cl. ............343/108 R, 343/113 R, 343/107
[51] Int. Cl. ..............................G01s 1/18, G01s 1/16
[58] Field of Search ......................343/108 R, 113 R

[56] References Cited

UNITED STATES PATENTS 3,164,831  1/1965  Mraz......................343/113 R
3,382,499  5/1968  Baud......................343/113 R Primary Examiner—Benjamin A. Borchelt
Assistant Examiner—S. C. Buczinski
Attorney—F. H. Henson, E. P. Klipfel and J. L. Wiegreffe

[57] ABSTRACT

A receiver system for determining the angle and direction between the longitudinal axis of a vehicle such as an aircraft and the direction of propagation from a source of radiation such as a VHF localizer navigation system. The receiver utilizes a pair of antennas having a mutual spacing determined by the desired accuracy and permitted ambiguities, mounted in the forward section of the aircraft such that one antenna is located on each side of the forward section of the aircraft. The antennas define a baseline therebetween which is substantially perpendicular to the longitudinal axis of the aircraft. The system permits the measurement of the direction of arrival of electromagnetic energy from the localizer system with respect to the baseline of the two antennas by converting the difference in RF phase of the signal respectively received by the pair of antennas to a difference in audio phase from a reference frequency generated by and in the receiver itself.

10 Claims, 11 Drawing Figures

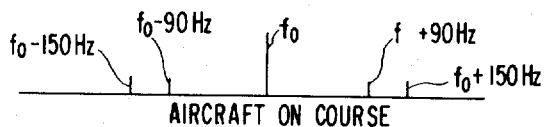
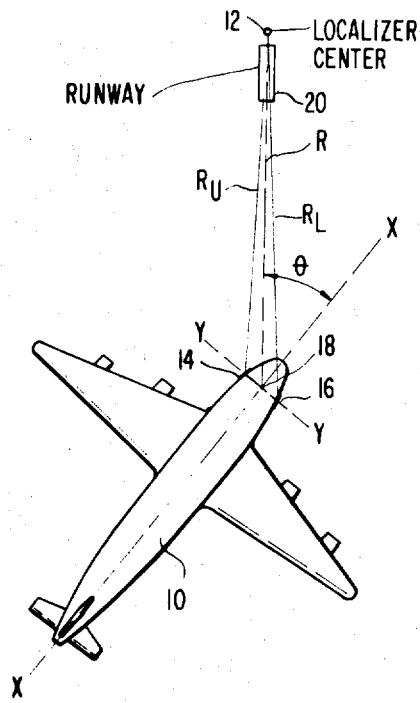
FIG. 1
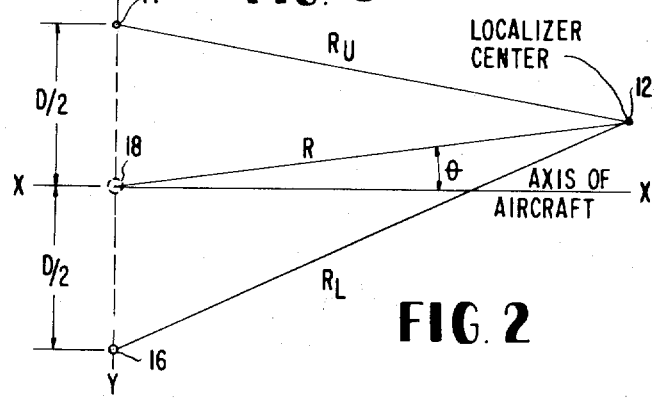
FIG. 3
FIG. 2
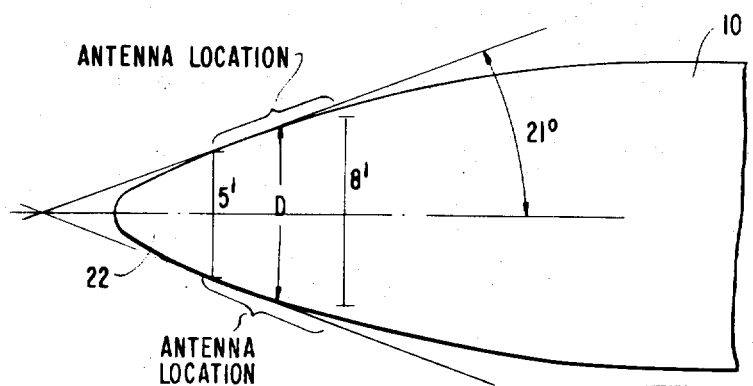
FIG. 4A
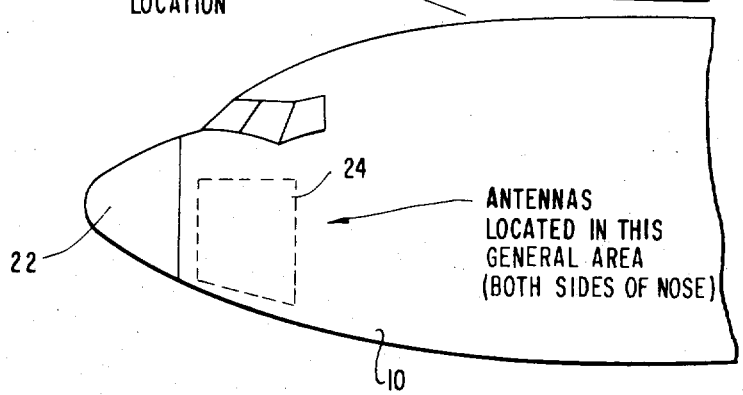
FIG. 4B

INTERFEROMETER AND ANGLE ENCODING NAVIGATION SYSTEM

BACKGROUND OF THE INVENTION

1. Field of the Invention

This invention relates to a precision electromagnetic navigation system of the interferometer type and more particularly to a system having at least two spaced apart antennas receiving the same electromagnetic wave signals from a remote source, translating the electromagnetic energy on one outer antenna up in frequency to form an upper sideband and translating the energy down in frequency on the other outer antenna to form a lower sideband whereupon the angle in space of the axis of a vehicle such as aircraft with respect to the location of the electromagnetic wave signal source is determined at the vehicle from the phase with respect to a reference of an amplitude modulated signal formed by combining appropriate amounts of the two sideband signals with portions of the unmodulated received energy.

2. Description of the Prior Art

An interferometer precision navigation ground system utilizing a fixed linear array of a carrier antenna and sideband antennas, in which the angle in space with respect to the location of the ground system is encoded on a microwave carrier is disclosed in U.S. Pat. No. 3,434,144 issued to H. W. Cooper, the applicant of the subject invention. The Cooper patent discloses not only a three antenna array but also a two antenna array wherein the interference carrier radiation from the two antennas forms a reference carrier radiation pattern centered on a line spaced equally from each antenna and parallel to the center lines of the two sideband patterns.

Other interferometer systems using two antennas are also known to those skilled in the art, however, these systems servo drive the phase of one antenna to a null or use phase lock oscillators to provide offset frequency for one of the two antennas of the interferometer.

Systems further illustrative of the state of the art are noted as follows:

U.S. Pat. No. 3,345,634 M. Bellenger
U.S. Pat. No. 3,376,573 E. F. Read
U.S. Pat. No. 3,378,849 B. Letellier
U.S. Pat. No. 3,392,391 D. E. Royal
U.S. Pat. No. 3,482,247 W. J. Thompson

SUMMARY

Briefly, the subject invention is directed to a two antenna array interferometer system responsive to a remote source of electromagnetic energy such as a localizer radiating a carrier signal which need have but a single spectral line, said interferometer system comprising a pair of antennas located on a linear baseline perpendicular to the longitudinal axis of a vehicle such as an aircraft and having a mutual separation determined by desired accuracy or allowable ambiguities, typically in the order of one wavelength or less of the localizer carrier signal. The pair of antennas are respectively located on either side of the forward portion of the vehicle and the angle of the longitudinal axis of the aircraft with respect to the radial to the localizer is encoded as an audio or video frequency on upper and lower sidebands which are generated in the vehicle. Circuit means are coupled to each of the two antennas for obtaining the localizer carrier signal. A portion of the signal at each antenna is then respectively translated up in frequency and down in frequency to provide both the upper and lower sideband signals. The two sideband signals are generated by individual phase modulators and receive a common audio frequency input from a modulation source whereupon the sidebands are respectively advanced and retarded in phase relative to the audio frequency modulation by the RF phase of the energy received. The outputs of the respective phase modulators are fed into a combining network whereupon the difference in path lengths from the localizer to each antenna on the aircraft results in the phase shift at the localizer carrier frequency being automatically translated into a phase shift of audio frequency and is provided as an output from the combining network. This audio phase shift is compared against the reference phase of the signal applied to the phase modulators from the modulation source by means of an envelope detector and a phase comparator whereupon the desired angle information output is provided.

BRIEF DESCRIPTION OF THE DRAWINGS

FIG. 1 is a diagrammatic representation of an aircraft approaching a runway having a localizer system defining a course line for navigation purposes;

FIG. 2 is a graphical representation of the antenna array geometry of the subject invention with respect to a localizer signal source;

FIG. 3 is a diagrammatic representation of the electromagnetic spectrum of one type of localizer system for use in connection with the subject invention and the change thereof as the aircraft course varies;

FIGS. 4A and 4B are illustrative top plan and side elevational views respectively of the front portion of an aircraft showing the location of the antenna array utilized by the subject invention;

DESCRIPTION OF THE PREFERRED EMBODIMENT

Figure 5:
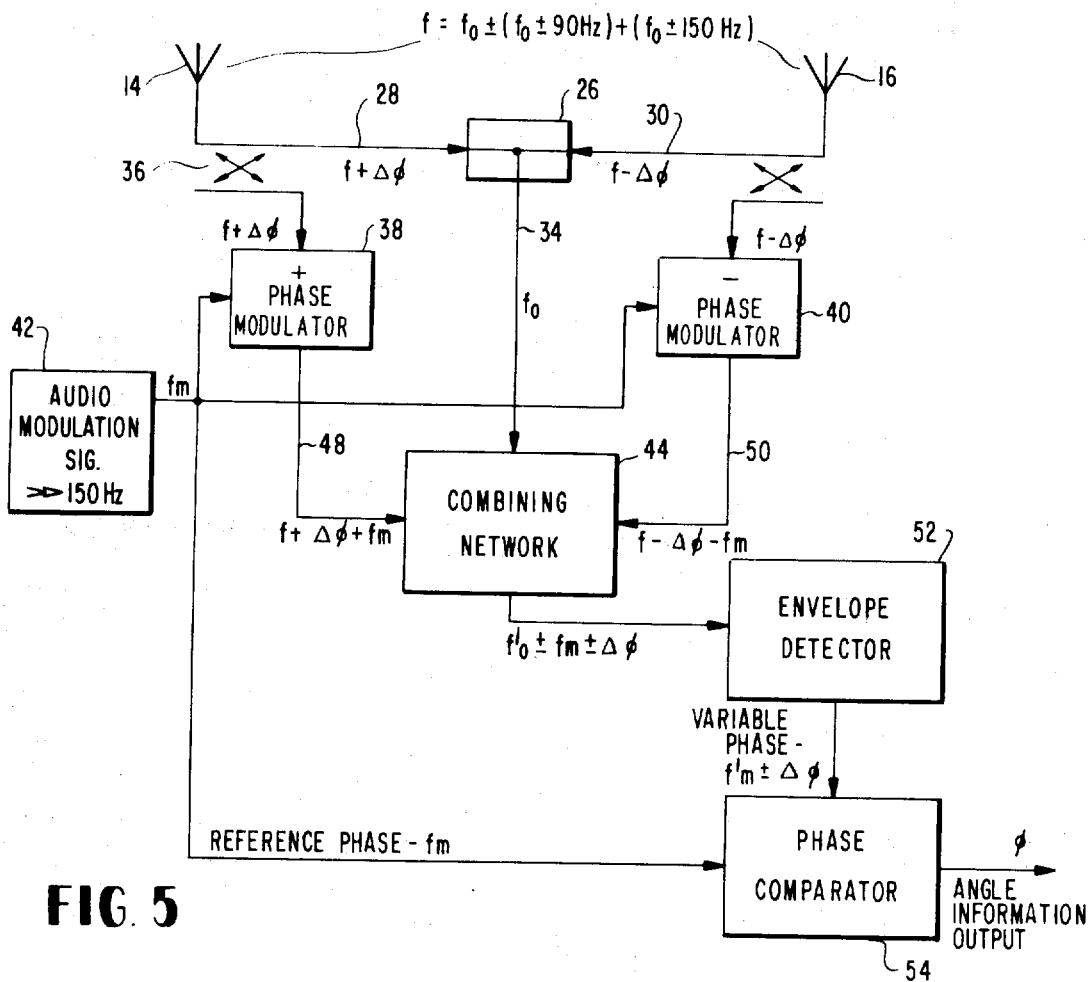
FIG. 5 is a block diagram of the preferred embodiment of the present invention.

Referring now to the drawings wherein like numerals refer to like parts, attention is directed now specifically to FIGS. 1 and 2 wherein reference numeral 10 designates a vehicle such as an aircraft upon which an interferometer navigation system forming the subject invention is located. The subject invention comprises an electronic receiver, not shown, responsive to electromagnetic signals preferably in the VHF range of frequencies radiated from a localizer signal source 12. The subject invention utilizes, inter alia, two antennas 14 and 16 located on either side of the front or nose portion of the aircraft 10. The antennas 14 and 16 are symmetrically located with respect to the longitudinal axis X—X of the aircraft 10 and along a linear baseline Y—Y which is substantially perpendicular to the aircraft X—X axis. It is the purpose of the subject invention to navigate the aircraft 10 in response to a radiated signal from the localizer 12 and determine an angle in space θ which may be, for example, the "crab angle" of the aircraft with respect to an airport runway 20 as defined by the radial R of the localizer beam from the center of localizer 12 and a point 18 equidistant between the antennas 14 and 16 on the baseline Y—Y and the intersection of the aircraft axis X—X. By determining the angle θ, the required aircraft "decrabbing" maneuver can be established to minimize cross wind effect. This is provided by means of a vehicle based interferometer system which permits the measurement of the direction of arrival of electromagnetic energy with respect to the baseline of the antenna array by sensing the difference in RF phase (time of arrival) of the radiated localizer signal received by the two antenna elements 14 and 16. This is shown geometrically in FIG. 2. The lengths of the propagation paths from the center of the localizer 12 to the antennas 14 and 16 are designated $R_L$ and $R_U$ while the signal path to the midpoint between the antennas 14 and 16 is designated R. The distance of the antennas 14 and 16 from the midpoint 18 is designated by a distance D/2. Stated mathematically:

$R_U^2 = (R \sin\theta - D/2)^2 + (R\cos\theta)^2 = R^2 - RD\sin\theta + D^2/4$ $R_L^2 = (R\sin\theta + D/2)^2 + (R\cos\theta)^2 = R^2 + RD\sin\theta + D^2/4$ $R_U, R_L = R\left[1 \mp \frac{D}{R}\sin\theta + \left(\frac{D}{2R}\right)^2\right]^{1/2}$ $\approx R[1 \mp (D/2R)\sin\theta + \frac{1}{2}(D/2R)^2]$ by use of the binomial approximation.

For the case where R is much more greater than the distance D between the two antennas 14 and 16 the propagation paths $R_U$, $R_L$ and R are essentially parallel and the term $\frac{1}{2}(D/2R)^2$ can be neglected compared to unity. If the axis X—X of the aircraft 10 points to the localizer antenna 12 the angle θ is equal to 0, and $R_U = R_L \approx R$. As the axis X—X of the aircraft 10 moves to the right of the localizer 12, $R_U$ decreases by the amount $(D/2)\sin\theta$ while $R_L$ increases by the same amount. As the aircraft axis X—X moves left, the opposite situation prevails.

Referring now to FIG. 3, there is shown a graphical illustration of an electromagnetic radiation spectrum of a signal such as would be radiated from the localizer 12 and which transmits a spectral line at its carrier frequency $f_o$, upper sideband frequencies $f_o - 90$Hz and $f_o - 150$Hz, and lower sideband frequencies $f_o - 90$Hz and $f_o - 150$Hz. These sideband frequencies carry the information of angular position of the aircraft antenna with respect to the runway. For example, if the aircraft is on course the amplitudes of the sidebands $f_o \pm 90$Hz and $f_o \pm 150$Hz will be substantially equal. However if the aircraft is to the left of the runway the $f_o \pm 90$Hz sideband will predominate while the $f_o \pm 150$Hz sideband will predominate for an aircraft position to the right of the runway. These sidebands, however, are not required for the operation of the subject invention but are merely shown for sake of explanation. In a similar manner the carrier signal from a VOR system could be filtered and the carrier only used. The present invention need only be responsive to the carrier frequency $f_o$ since modulation and a reference phase will be generated by the receiver itself as will be explained subsequently as well as deriving the radiated carrier frequency without the necessity of a central antenna in the plane of the two sideband antennas. The radiated signal is received by the pair of antennas 14 and 16 separarated by the distance D. Because the antennas 14 and 16 are separated by an equal distance D/2 on either side of the axis of the aircraft, the midpoint 18 will act as a "phantom antenna" located midway between the antennas 14 and 16. This phantom antenna may be regarded as the element for obtaining or deriving the radiated carrier signal $f_o$.

The antennas contemplated by use by the subject invention are located on or near the outer surface of the aircraft 10 in the front portion thereof on either side of the nose of the aircraft 10 such as shown in FIGS. 4A and 4B. Conventional aircraft normally include radar apparatus which is mounted at the nose of the aircraft 10 and covered by a radome 22. The location of the antennas are located in a general area designated by reference numeral 24 as shown in FIG. 4B and are adapted to have a selective spacing D of between 5 and 8 feet such as shown in FIG. 4A. This spacing is normally in the order of one wavelength of the carrier frequency $f_o$ but is determined primarily by aircraft size. This consideration then indicates that the configuration of the antenna spacing such as shown in FIG. 4A and 4B is adapted for use with a ground based localizer system having a carrier frequency $f_o$ of approximately 0.1GHz. It should be observed, however, that the present explanation is being presented for purposes of illustration only, it being understood that other carrier frequency bands may be utilized when desirable, bearing in mind that the wavelength does have a bearing on the antenna separation and the placement thereof on the vehicle.

What has been considered thus far is the general requirements of a vehicle based interferometer system utilized in connection with a remotely located localizer system and the object of the interferometer system to provide an output signal indicative of an angle in space θ of the central axis X—X of the vehicle with respect to a central radial R to the localizer source.

Considering now the preferred embodiment of the subject invention with respect to its electrical components, reference is made to FIG. 5 wherein the antennas 14 and 16 are responsive to the radiated localizer signal $f = f_o + (f_o \pm 90\text{Hz}) + (f_o \pm 150\text{Hz})$. A portion of the energy received by the antennas 14 and 16 is coupled into circuit means 26 which may comprise a microwave element such as a hybrid junction or a magic T by means of the transmission line circuit means 28 and 30, respectively. The circuit means 26 operates to combine the energy $f + \Delta\phi$ and $f - \Delta\phi$ where $\Delta\phi$ constitutes an RF shift which is a function of the differential distance from each antenna to the radiation source on the ground and derives an output signal, for example, $f_o$ which is equal to the radiated carrier frequency from the remote localizer system 12.

The means 26 then acts as a "phantom antenna" for the carrier frequency which is essential in order to obtain a direction sense for the space angle $\theta$ as will be shown subsequently. The derived carrier frequency $f_o$ is supplied to a combining network 44 by means of transmission line circuit 34. A second portion of the signal energy $f + \Delta\phi$ is coupled from the transmission line circuit means 28 by means of the coupler 36 and applied to a phase modulator 38. In a similar manner, a second portion of the signal energy $f - \Delta\phi$ is coupled from the transmission line circuit means 30 and applied to a second phase modulator 40.

An audio frequency signal $f_m$ is commonly coupled from an audio modulation signal source 42 to the two phase modulators 38 and 40. These modulators are actually frequency translators or phase shifting devices of identical construction being, for example, digitally stepped ferrite or diode phase modulators of the serrodyne type or of any other suitable types well known to those skilled in the art. The audio signal $f_m$ applied to the modulator 38 translates the frequency of the signal $f + \Delta\phi$ up in frequency by an amount $f_m$ providing an output therefrom of $f + \Delta\phi + f_m$. The audio signal $f_m$ applied to the phase modulator 40, on the other hand, is coupled thereto so that it translates the energy from antenna 16 $f - \Delta\phi$ by the same amount but in the opposite direction, thus providing an output therefrom of a signal $f - \Delta\phi - f_m$.

These signals are fed into the combining network 44 by means of the transmission line circuit members 48 and 50. The audio signal frequency translation applied to the signals $f + \Delta\phi$ and $f - \Delta\phi$ in effect creates an upper and lower sideband in the receiver itself. The difference in path length from the localizer signal to the antennas 14 and 16 in the aircraft resulting in a microwave or RF phase shift $\Delta\phi$ is automatically translated into a shift of audio phase such that the combining network 44 provides a resultant output of the carrier frequency $f_o$ which is either advanced or retarded in audio phase with respect to the modulating signal $f_m$ depending upon the position of the antennas 14 and 16 relative to the remote localizer 10 shown in FIG. 1. This signal is designated $f_o' \pm f_m \pm \Delta\phi$ such that for example if the antenna 14 is relatively closer to the localizer source 12 than the antennas 16, an output of $f_o' \pm f_m + \Delta\phi$ would be fed out of the combining network 44 whereas if the localizer 12 were relatively closer to the sideband antenna 16 an output of $f_o' \pm f_m - \Delta\phi$ would be obtained. Feeding this the signal output of the combining network 44 into an envelope detector 52 removes the carrier component and derives an output of a variable phase audio signal $f_m' \pm \Delta\phi$ which when fed into a phase comparator circuit 54 also having the audio modulation signal $f_m$ applied thereto, will provide an output of $\phi$ which is a function of the space angle $\theta$ which can be displayed in any desired form in the aircraft.

Thus by providing a frequency translation up in frequency on the energy received by one receiving antenna and down in frequency for the energy received on the other antenna and then combining these two signals with an unmodulated or untranslated combination of the received energy at the two antennas which acts as the carrier it becomes possible to encode the phase shift on the audio modulation. This combined or resultant signal which is amplitude modulated is then decoded and the direction information is obtained by comparing the phase shift in this signal with the reference signal which is used to provide the frequency translation.

Figure 6A:
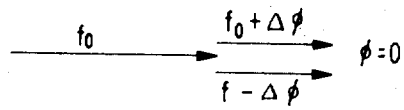
FIGS. 6A, 6B, and 6C are graphs illustrating the relative phase of the received signals from the localizer and helpful in understanding the operation of the subject invention.
Figure 6B:
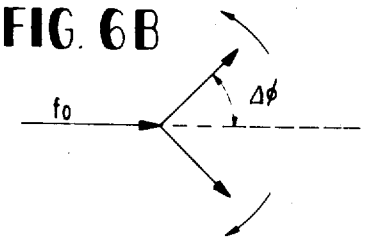
Figure 6C:
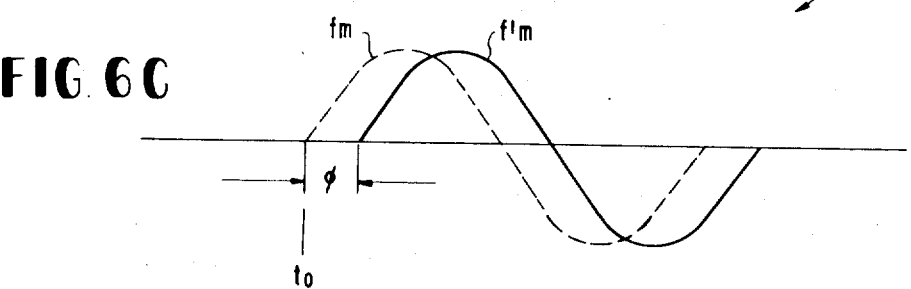

In view of the description of the electronic block diagram of the preferred embodiment of the subject invention and noting that the circuit element 26 acts as a "phantom antenna" to derive the carrier frequency $f_o$, FIGS. 6A, 6B and 6C are helpful in understanding the operation of the system to provide a direction sense. For example, assuming a sine wave phase modulation signal $f_m$ being applied to the modulators 38 and 40 at a fixed audio frequency by means of the signal source 42, if the localizer signal source 12 is directly in line with the axis X—X of the aircraft 10 shown in FIG. 1, the instantaneous position of the sidebands relative to the carrier are as depicted in the vector diagram shown in FIG. 6A. If the axis X—X of the aircraft 10 moves to the right of the localizer 12, each signal path changes by $D/2 \sin\theta$ as described above and the corresponding phase shift angle $\phi$ shown in FIG. 6B occurs wherein $\phi = (\pi D/\lambda) \sin\theta \approx (\pi D/\lambda)\theta$.

FIGS. 6A and 6B represent vector diagrams at the same given instant of time but at different angular positions in space. Both vectors $f + \Delta\phi$ and $f - \Delta\phi$ represent amplitude modulation of the same amount but the phase of the resultant detected modulation signal $f_m'$ such as shown in FIG. 6C is advanced over the reference phase signal $f_m$. If a point with the axis X—X of the aircraft 10 to the left were considered a similar situation would exist but the modulation phase of the signal $f_m'$ would be retarded in comparison with the reference phase signal $f_m$. Thus a fixed percentage of amplitude modulation exists over a given region of space, but the phase of the modulation is a unique function of the angular position of the aircraft relative to the localizer source. In other words, the particular choice of antenna geometry and transmitted frequencies exhibits the unique property of translating a given microwave phase shift due to a minor pathlength variation directly into an identical phase shift at an audio modulation frequency supplied at the aircraft. By applying the reference modulation phase from the modulator 42 to the received signals $f + \Delta\phi$ and $f - \Delta\phi$ in addition to the derived carrier frequency $f_o$, the airborne receiver such as shown in FIG. 5 can detect the radiated signal, measure the actual modulation phase with respect to the reference phase and thereby compute the angle $\theta$, that is $\theta \approx \phi \lambda / \pi D$.

Since at any given point in space $\phi$ can only be measured over the range of $\pm \pi$ radians, there can be ambiguity in the $d/2\lambda$ determination of $\theta$ if $d/2\lambda$ is greater than 1. However for the instant invention $d/2\lambda$ is less than 1 and therefore no ambiguity exists.

The inventive concept is similar to the system used in the very high frequency omnirange system (VOR) in which the ground system radiates an amplitude modulated pattern with the phase of the modulation being referenced to North as a zero reference. However, there are significant differences. The subject invention is a receiving system. Additionally, in the VOR system, both sidebands are impressed on each of the sideband antennas and the orthogonality of the antenna systems in space is used together with a quadrature phasing of the RF energy to rotate an RF pattern at an audio modulation rate. In such a system there is necessarily a one to one correspondence between RF phase angle and space phase angle. The unique feature of the subject invention is that by modulating part of the energy of a single spectral line received by each antenna by a reference phase at an audio rate and deriving a carrier from combining the balance of the energy, such a one to one limitation no longer applies and the RF phase shift per degree of space angle may be increased arbitrarily subject to limitations of vehicle structure.

Figure 7:
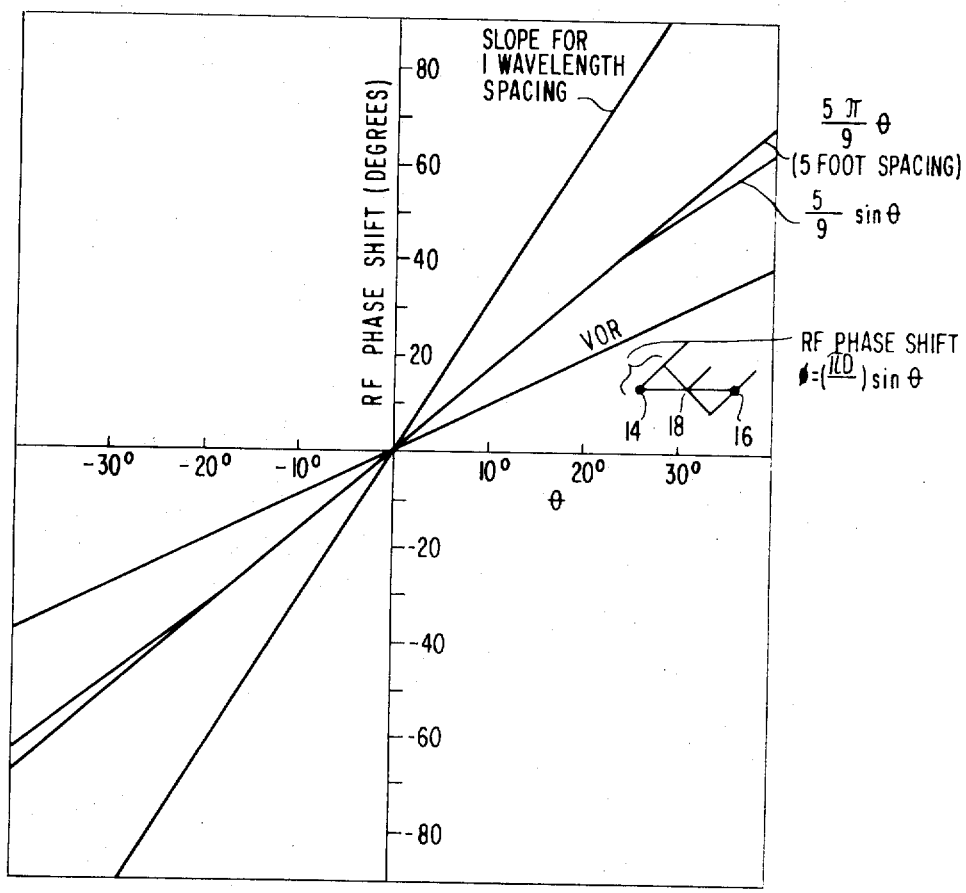
FIG. 7 is a graph representative of the relationship of phase shift vs. space angle for a two element antenna array such as utilized with respect to the subject invention.
Figure 8:
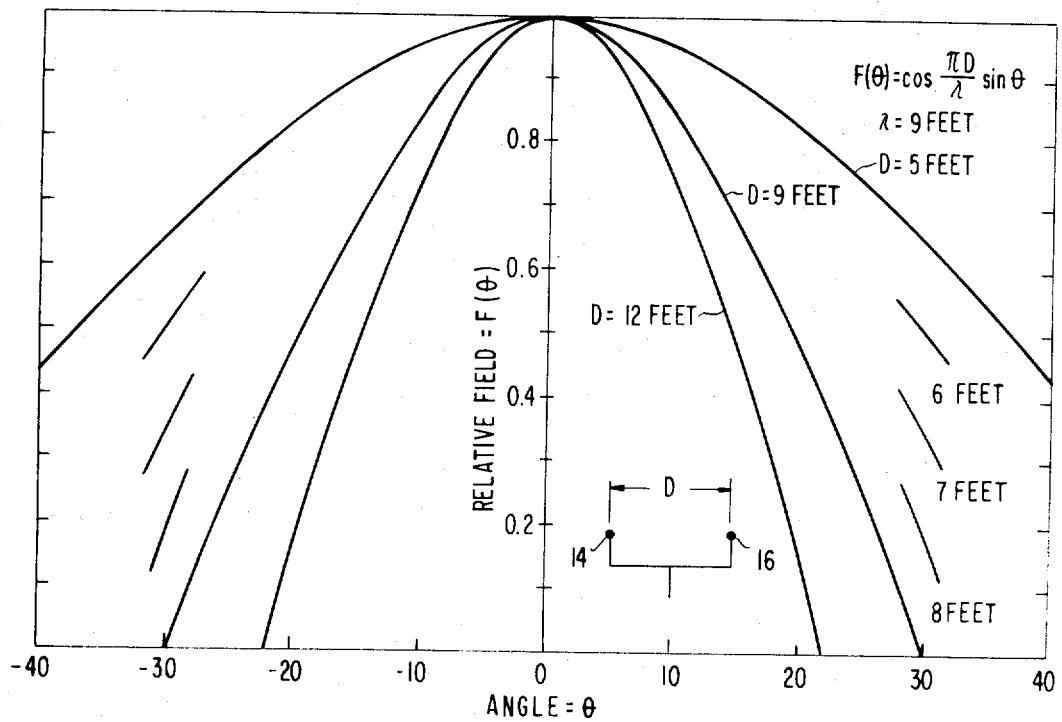
FIG. 8 is a graph illustrative of the amplitude sensitivity of the received signals vs. space angle for a two element antenna array such as utilized with the subject invention.

The characteristics of a system comprising the subject invention are shown in the graphs depicted at FIGS. 7 and 8. FIG. 7, for example, is illustrative of the RF phase shift between the received energy of a two antenna element array arranged such as shown in FIGS. 4A and 4B as compared to the phase characteristic of a conventional VOR system. For example, for a space angle of 10° a VOR system provides a RF phase shift in the order of 10° whereas an antenna configuration having a spacing in the order of one wavelength (10 feet) provides an RF phase shift of approximately 30°, thus illustrating that the sensitivity is increased utilizing a two antenna array having a spacing in the order of one wavelength.

FIG. 8, on the other hand, discloses a graph of the computed antenna patterns of a two element array for various spacings D between the antenna elements without taking into account the shadowing effect of the antennas being mounted on the side of the nose of the aircraft. The carrier voltage for the two antenna configuration as shown in FIGS. 4A and 4B changes as the pattern of the system varies with respect to the space angle $\theta$. From the graphs it discloses that for spacings of 8 feet or more, the level drops to an unacceptable point at a space angle of 30°; moreover, for a spacing of 9 feet the carrier voltage level drops to zero.

In summary, the disclosed invention provides a means of encoding phase information on a vehicle carried interferometer system which permits the measurement of the direction of arrival of electromagnetic energy with respect to the axis of the receiver antenna array by converting the difference in phase of the RF signal received by two antenna elements to a difference in phase from a reference phase of an audio modulation frequency modulating the received signal at the receiver and automatically translating the relatively small microwave phase shift due to a minor path length variation directly into an identical phase shift at the relatively low modulation frequency which is then measured by conventional techniques.

I claim as my invention:

1. An interferometer navigation system for determining the space angle between the longitudinal axis of a vehicle and a reference course line as established by a remote source of electromagnetic radiation, said system comprising in combination:

a first and a second receiving antenna mounted respectively on each side of the forward portion of said vehicle, said antennas being located along a line substantially transverse to said longitudinal axis of said vehicle;

circuit means coupled to said first and second antenna and being operable to receive a portion of the electromagnetic energy received by said antennas from said source to provide an output signal corresponding to one frequency radiated from said source;

a first and second electronic signal coupler respectively connected to said first and second antenna;

first and second phase modulation means respectively coupled to said first and second electronic signal couplers, said first and second phase modulation means being adapted to operate in opposite phase senses with respect to each other to translate the frequency of electromagnetic energy coupled thereto up and down in frequency respectively to effectively create upper and lower sidebands of said one frequency;

a modulation signal source commonly coupled to said first and second phase modulation means, said source generating and applying a relatively low frequency modulation signal with respect to said one frequency thereto for providing said frequency translation;

an RF signal combining network coupled to the output of said circuit means and said first and second phase modulation means, providing an output therefrom corresponding to said one frequency having a phase component with respect to said low frequency modulation voltage which is a function of the space angle of the vehicle relative to said remote source;

detector means coupled to said RF signal combining network for providing an output therefrom of said relatively low frequency including said phase component and which corresponds to the difference in RF phase of the signals received at said first and second antenna; and phase comparator means coupled to said envelope detector and said modulation signal source for comparing said relatively low frequency modulation signal and the output of said detector means for providing an output thereof corresponding to the angle of the longitudinal axis of said vehicle with respect to said reference course line.

2. The invention as defined by claim 1 wherein said one frequency corresponds to the carrier frequency of said source of radiation and said modulation signal source generates an audio frequency signal.

3. The invention as defined by claim 1 wherein said phase modulation means are respective serrodyne modulators.

4. The invention as defined by claim 1 wherein said predetermined distance of separation between said first and second antenna is in the order of one wavelength of the electromagnetic radiation from said remote source.

5. The invention as defined by claim 1 wherein said circuit means comprises a magic T RF component.

6. The invention as defined by claim 1 wherein said circuit means comprises a hybrid junction RF component.

7. The invention as defined by claim 5 wherein said first and second signal couplers are comprised of RF couplers.

8. The invention as defined by claim 4 and wherein said relatively low frequency modulation signal comprises a video or an audio frequency signal.

9. The invention as defined by claim 8 and wherein said detector means comprises an RF envelope detector.

10. The invention as defined by claim 4 wherein said first and second antenna elements are comprised of antennas mounted on the outside surface of said vehicle.

* * * * *